United States Patent
Yang et al.

(10) Patent No.: US 12,495,238 B2
(45) Date of Patent: Dec. 9, 2025

(54) HEADPHONES FOR DETECTING A WEARING MODE AND HEADPHONES FOR DETECTING AN EARMUFF MATERIAL

(71) Applicant: GOERTEK INC., Shandong (CN)

(72) Inventors: Zongxu Yang, Shandong (CN); Jiaqi Dong, Shandong (CN)

(73) Assignee: GOERTEK INC., Shandong (CN)

( * ) Notice: Subject to any disclaimer, the term of this patent is extended or adjusted under 35 U.S.C. 154(b) by 238 days.

(21) Appl. No.: 18/250,299

(22) PCT Filed: Jun. 28, 2021

(86) PCT No.: PCT/CN2021/102716
§ 371 (c)(1),
(2) Date: Apr. 24, 2023

(87) PCT Pub. No.: WO2022/088721
PCT Pub. Date: May 5, 2022

(65) Prior Publication Data
US 2023/0396914 A1    Dec. 7, 2023

(30) Foreign Application Priority Data
Oct. 29, 2020  (CN) .......................... 202011185681.5

(51) Int. Cl.
*H04R 1/10* (2006.01)
*G01D 5/14* (2006.01)

(52) U.S. Cl.
CPC ........... *H04R 1/1041* (2013.01); *G01D 5/145* (2013.01); *H04R 1/1016* (2013.01)

(58) Field of Classification Search
CPC ..... H04R 1/1041; H04R 1/1016; G01D 5/145
See application file for complete search history.

(56) References Cited

U.S. PATENT DOCUMENTS

| | | | |
|---|---|---|---|
| 9,325,828 B1 | 4/2016 | Oh et al. | |
| 9,756,412 B1 | 9/2017 | Bacon | |
| 10,057,674 B1* | 8/2018 | Tseng | ................... H04R 1/1041 |
| 11,937,043 B2* | 3/2024 | Eggert-Richter | .... H04R 1/1008 |

(Continued)

FOREIGN PATENT DOCUMENTS

| | | |
|---|---|---|
| CN | 203912140 U | 10/2014 |
| CN | 204906670 U | 12/2015 |

(Continued)

*Primary Examiner* — Simon King
(74) *Attorney, Agent, or Firm* — Ingrassia Fisher & Lorenz, LLP

(57) ABSTRACT

Headphones configured to detect a wearing mode include, but are not limited to, a main body provided therein with a control module and a speaker that are connected with each other; a first earplug detachably connected with the main body and is configured to plug in an ear canal; a second earplug detachably connected with the main body and is configured to plug in an ear canal; a sensing member provided on the main body and connected with the control module; and a sensed member provided on the first earplug or the second earplug; wherein an insertion depth of the first earplug is different from an insertion depth of the second earplug, and when the earplug provided with the sensed member is connected with the main body, the sensed member is within a sensing range of the sensing member.

6 Claims, 3 Drawing Sheets

(56) References Cited

U.S. PATENT DOCUMENTS

| | | | |
|---|---|---|---|
| 2008/0128198 A1* | 6/2008 | Du | A61F 11/14 |
| | | | 181/129 |
| 2012/0099738 A1 | 4/2012 | Lee et al. | |
| 2017/0099539 A1* | 4/2017 | Di Censo | G05D 23/00 |
| 2018/0333091 A1* | 11/2018 | Goldman | H04M 1/05 |
| 2019/0075388 A1* | 3/2019 | Schrader | G06F 3/011 |
| 2019/0110123 A1* | 4/2019 | Baker | H04R 1/1075 |
| 2019/0110929 A1* | 4/2019 | Persson | H04R 1/1041 |
| 2019/0174215 A1 | 6/2019 | Yang | |
| 2020/0037061 A1* | 1/2020 | Boulanger | H04R 1/1041 |
| 2020/0037076 A1* | 1/2020 | Boulanger | H04R 1/1041 |
| 2020/0100010 A1 | 3/2020 | Yang et al. | |
| 2020/0280789 A1* | 9/2020 | Schrader | H04R 1/105 |
| 2020/0396532 A1* | 12/2020 | Bui | H04R 1/1083 |
| 2021/0084402 A1* | 3/2021 | Terlizzi | H04B 5/77 |
| 2023/0030946 A1* | 2/2023 | Warren | H04R 1/1041 |

FOREIGN PATENT DOCUMENTS

| | | |
|---|---|---|
| CN | 105704593 A | 6/2016 |
| CN | 105744408 A | 7/2016 |
| CN | 106131726 A | 11/2016 |
| CN | 205793193 U | 12/2016 |
| CN | 107306369 A | 10/2017 |
| CN | 108293158 A | 7/2018 |
| CN | 208386874 U | 1/2019 |
| CN | 109495802 A | 3/2019 |
| CN | 209017253 U | 6/2019 |
| CN | 110114738 A | 8/2019 |
| CN | 209283438 U | 8/2019 |
| CN | 110324751 A | 10/2019 |
| CN | 210093459 U | 2/2020 |
| CN | 110891219 A | 3/2020 |
| CN | 210431797 U | 4/2020 |
| CN | 111683320 A | 9/2020 |
| CN | 211406231 U | 9/2020 |
| CN | 112333592 A | 2/2021 |

\* cited by examiner

HEADPHONES FOR DETECTING A WEARING MODE AND HEADPHONES FOR DETECTING AN EARMUFF MATERIAL

CROSS-REFERENCE TO RELATED APPLICATION

This Application is a U.S. National-Stage entry under 35 U.S.C. § 371 based on International Application No. PCT/CN2021/102716, filed Jun. 28, 2021 which was published under PCT Article 21(2) and which claims priority to Chinese Application No. 202011185681.5, filed Oct. 29, 2020, which are all hereby incorporated herein in their entirety by reference.

TECHNICAL FIELD

This application pertains to the technical field of audio output devices, in particular to headphones for detecting a wearing mode and headphones for detecting an earmuff material.

BACKGROUND

Headphones are an electro-acoustic converter device. When they work, they need to be worn on human ears to receive electrical signals output from a media player or a receiver, and then the electrical signals are converted into audible sound waves and transmitted to the ear canal of the wearer through a loudspeaker attached closely to the ear, thereby realizing the audio playback function.

With the development of headphone products, their types are increasingly diversified. Generally, headphone products can be divided into two types: in-ear type and head-mounted type. The in-ear headphones can be divided into two types according to the in-ear structure: in-ear (i.e., full in-ear) and semi-in-ear. Both have merits and shortcomings. The in-ear headphones can be worn closely and tightly, and thus can better isolate external noise, which is conducive to active noise reduction and ensuring low frequency intensity; however, their wearing comfort is poor, which is easy to cause discomfort to users. On the contrary, the semi-in-ear headphones can ensure good wearing comfort and can realize long time unsensible wearing, but they cannot effectively isolate external noise, which is not conducive to the realization of active noise reduction, and the low frequency energy leakage is also large. As to head-mounted headphone products, according to the materials of earmuffs, they can be divided into headphones with leather earmuffs and headphones with cloth earmuffs.

At present, there are few in-ear headphone products that can be compatible with both in-ear and semi-in-ear designs, or headphone products that take into account both leather earmuffs and cloth earmuffs. In addition, in order to determine the wearing mode (in-ear or semi-in-ear) and the earmuff material (leather earmuffs or cloth earmuffs), a very complicated acoustic leak detection algorithm is needed. In addition, other objects, desirable features and characteristics will become apparent from the subsequent summary and detailed description, and the appended claims, taken in conjunction with the accompanying drawings and this background.

SUMMARY

The main object of the present disclosure is to propose headphones for detecting a wearing mode and headphones for detecting an earmuff material, which aim to identify and detect different wearing modes and different earmuff materials and thus facilitate the subsequent realization of different sound effects and functions.

In order to achieve the above object, the present disclosure proposes headphones for detecting a wearing mode, which comprises:
  a main body provided therein with a control module and a speaker that are connected with each other;
  a first earplug detachably connected with the main body and for plugging in an ear canal;
  a second earplug detachably connected with the main body and for plugging in an ear canal;
  a sensing member provided on the main body and connected with the control module; and
  a sensed member provided on the first earplug or the second earplug;
  wherein an insertion depth of the first earplug is different from an insertion depth of the second earplug, and when the earplug provided with the sensed member is connected with the main body, the sensed member is within a sensing range of the sensing member.

Optionally, the sensing member is a Hall sensor and the sensed member is a magnet.

Optionally, the main body is provided thereon with a position-limiting member, the first earplug and the second earplug are provided thereon with a positioning member, and the positioning member is matched with the position-limiting member;
  when the first earplug or the second earplug is connected with the main body, the positioning member is engaged with the position-limiting member, and the sensed member on the first earplug or the second earplug directly faces toward the sensing member.

Optionally, one of the position-limiting member and the positioning member is a bump, and the other is a groove.

Optionally, the main body is provided thereon with a sound exit pipe, the first earplug and the second earplug are provided with a sound exit hole, and the sound exit hole is matched with the sound exit pipe; and the sound exit pipe has an asymmetrical shape.

In the technical solutions of the present disclosure, the first and second earplugs that can be detachably connected are provided on the main body, and the insertion depths of the first and second earplugs are different. The main body is provided thereon with the sensing member connected with the controller, and one of the first and second earplugs is provided thereon with the sensed member. When the earplug provided with the sensed member is connected with the main body, the sensing member will respond; when the earplug not provided with the sensed member is connected with the main body, the sensing member will not respond. Therefore, the control module can distinguish whether the first earplug or the second earplug is installed on the main body through the change of the responses of the sensing member, thereby realizing the identification and detection of different wearing modes to perform the corresponding audio control operation, and facilitating the subsequent realization of different sound effects and functions. The present disclosure identifies different wearing modes through the cooperation of the sensing member and the sensed member, the response of identification is fast, the accuracy is high, the additional cost is very low, and the original ID and appearance of the product are not affected.

In order to achieve the above object, the present disclosure also proposes headphones for detecting an earmuff material, which comprises:

a main body provided therein with a control module and a speaker that are connected with each other;

a first earmuff detachably connected with the main body and for covering an ear;

a second earmuff detachably connected with the main body and for covering an ear;

a sensing member provided on the main body and connected with the control module; and a sensed member provided on the first earmuff or the second earmuff;

wherein a material of the first earmuff is different from a material of the second earmuff, and when the earmuff provided with the sensed member is connected with the main body, the sensed member is within a sensing range of the sensing member.

Optionally, the main body is provided thereon with a mounting member, the first earmuff and the second earmuff are provided thereon with a fixing member, and the fixing member is detachably connected with the mounting member.

Optionally, one of the mounting member and the fixing member is a snap protrusion and the other is a snap slot.

Optionally, the main body is provided thereon with the snap slot, the snap slot comprises an entry part and a clamping part, the entry part and the clamping part are arranged and connected along a circumferential direction of the main body, a slot body width of the entry part is the same as a slot body width of the clamping part, and a slot mouth width of the clamping part is less than a slot mouth width of the entry part; the first earmuff and the second earmuff are provided thereon with the snap protrusion, the snap protrusion comprises a connecting part and an acting part, the acting part is connected with the first earmuff or the second earmuff through the connecting part, a width of the connecting part corresponds to the slot mouth width of the clamping part, and a width of the acting part corresponds to the slot body width of the clamping part;

or, the first earmuff and the second earmuff are provided thereon with the snap slot, the snap slot comprises an entry part and a clamping part, the entry part and the clamping part are arranged and connected along a circumferential direction of the first earmuff or the second earmuff, a slot body width of the entry part is the same as a slot body width of the clamping part, and a slot mouth width of the clamping part is less than a slot mouth width of the entry part; the main body is provided thereon with the snap protrusion, the snap protrusion comprises a connecting part and an acting part, the acting part is connected with the main body through the connecting part, a width of the connecting part corresponds to the slot mouth width of the clamping part, and a width of the acting part corresponds to the slot body width of the clamping part.

Optionally, the main body is provided thereon with a plurality of the mounting members along a circumferential direction, and at least one of the mounting members is different in shape and/or size from other mounting members.

In the technical solutions of the present disclosure, the first and second earmuffs that can be detachably connected are provided on the main body, and the materials of the first and second earmuffs are different. The main body is provided thereon with the sensing member connected with the controller, and one of the first and second earmuffs is provided thereon with the sensed member. When the earmuff provided with the sensed member is connected with the main body, the sensing member will respond; when the earmuff not provided with the sensed member is connected with the main body, the sensing member will not respond. Therefore, the control module can distinguish whether the first earmuff or the second earmuff is installed on the main body through the change of the responses of the sensing member, thereby realizing the identification and detection of different earmuff materials to perform the corresponding audio control operation, and facilitating the subsequent realization of different sound effects and functions. The present disclosure identifies different earmuff materials through the cooperation of the sensing member and the sensed member, the response of identification is fast, the accuracy is high, the additional cost is very low, and the original ID and appearance of the product are not affected.

BRIEF DESCRIPTION OF DRAWINGS

The present invention will hereinafter be described in conjunction with the following drawing figures, wherein like numerals denote like elements, and: drawings can be obtained based on the provided drawings without paying creative efforts.

In the drawings.

100, headphones for detecting a wearing mode; 110, main body a; 111, control module a; 112, sensing member a; 113, sound exit pipe; 114, bump; 120, first earplug; 130, second earplug; 131, sensed member a; 132 groove;

200, headphones for detecting an earmuff material; 210, main body b; 211, control module b; 212, sensing member b; 213, snap slot; 220, first earmuff; 230, second earmuff; 231, sensed member b; 232, snap protrusion.

The realization of object, functional features and advantages of the present disclosure will be further described with reference to the attached drawings in combination with the embodiments.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The technical solutions in embodiments of the present disclosure will be described clearly and completely below with reference to the drawings in the embodiments of the present disclosure. Obviously, the embodiments as described are merely part of, rather than all, embodiments of the present disclosure. Based on the embodiments of the present disclosure, any other embodiment obtained by a person of ordinary skill in the art without paying any creative effort shall fall within the protection scope of the present disclosure.

It should be noted that all directional indications (such as up, down, left, right, front, back, etc.) in the embodiments of the present disclosure are only used to explain the relative positional relationship, the movement situation, etc. among various components under a certain posture (as shown in the accompanying drawings). If the specific posture changes, the directional indication will also change accordingly.

In addition, in the present disclosure, the terms "first" and "second" are used for descriptive purposes only and are not to be construed as indicating or implying relative importance or implicitly indicating the number of indicated technical features. Thus, a feature with "first" or "second" may explicitly or implicitly include at least one such a feature. In addition, the technical solutions in various embodiments of the present disclosure can be combined with each other if their combination is realizable to a person of ordinary skill in the art. When the combination of technical solutions is contradictory or cannot be realized, it should be considered that such a combination of technical solutions does not exist and is not within the scope of protection claimed in the present disclosure.

The present disclosure provides headphones 100 configured to detect a wearing mode and headphones 200 configured to detect an earmuff material.

Figure 1:
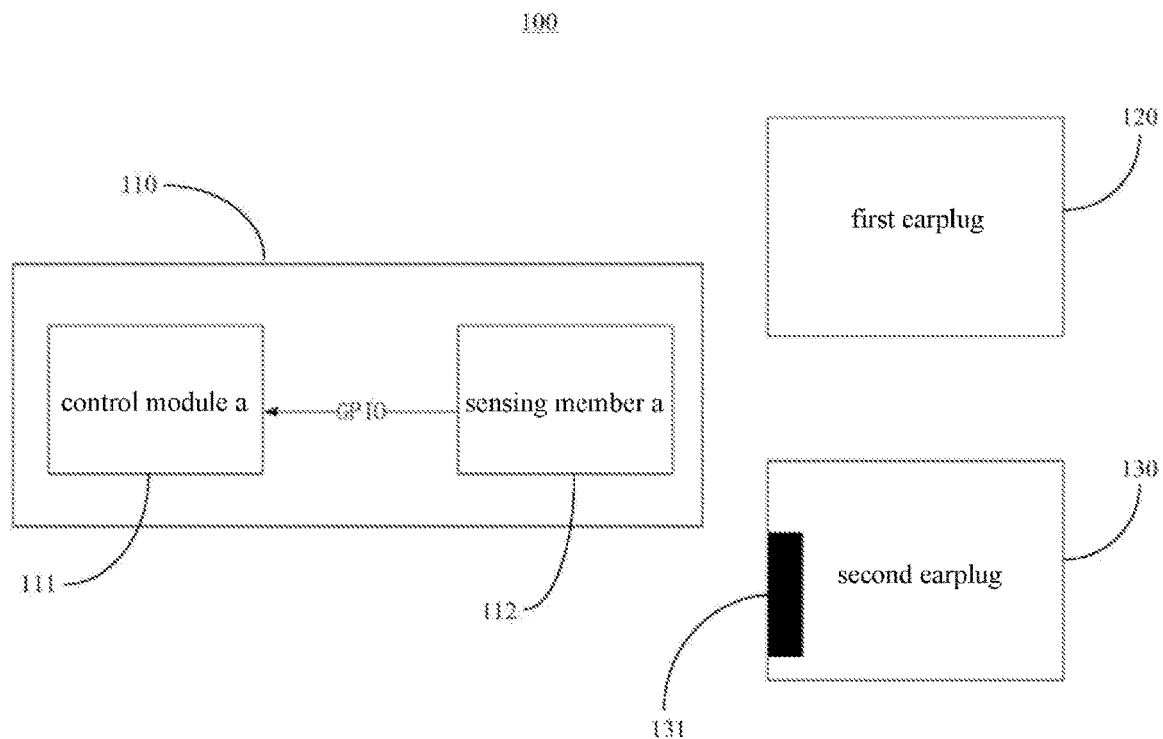
FIG. 1 is a schematic diagram of the circuit modules of headphones for detecting a wearing mode according to an embodiment of the present disclosure.

In the embodiment of the present disclosure, as shown in FIG. 1, the headphones 100 configured to detect a wearing mode comprises: a main body a110 provided therein with a control module a111 and a speaker (not shown in FIGs) that are connected with each other; a first earplug 120 detachably connected with the main body a110 and is configured to plug in an ear canal; a second earplug 130 detachably connected with the main body a110 and is configured to plug in the ear canal; a sensing member a112 provided on the main body a110 and connected with the control module a111; and a sensed member a131 provided on the first earplug 120 or the second earplug 130. An insertion depth of the first earplug 120 is different from an insertion depth of the second earplug 130, and when the earplug provided with the sensed member a131 is connected with the main body a110, the sensed member a131 is within a sensing range of the sensing member a112.

It can be understood that the control module a111 is used to control the output of audio and the speaker is used to output audio. Namely, the control module a111 receives electrical signals output from a media player or a receiver, converts the electrical signals into audible sound waves, and transmits them to the ear canal of the wearer through a speaker, thus realizing the audio playback function. In addition, both the first earplug 120 and the second earplug 130 may be made of silicone.

It should be noted that in this embodiment, the first earplug 120 is an in-ear earplug, and the second earplug 130 is a semi-in-ear earplug. The headphones 100 configured to detect a wearing mode are an in-ear headphones product which is compatible with two wearing modes: in-ear and semi-in-ear. That is to say, by detachably installing the first earplug 120 or the second earplug 130 on the main body a110, the insertion depth of the headphones 100 configured to detect a wearing mode can be changed, so that the headphones 100 configured to detect a wearing mode can switch between the in-ear headphones and the semi-in-ear headphones.

Specifically, in the state that the first earplug 120 is installed on the main body a110, the headphones 100 configured to detect a wearing mode are in-ear headphones. When the user wears the headphones 100 configured to detect a wearing mode, the first earplug 120 is inserted into the ear canal and closely fits with the ear canal, which can well isolate external noise, and is conducive to active noise reduction and ensuring low-frequency intensity; in the state that the second earplug 130 is installed on the main body a110, the headphones 100 configured to detect a wearing mode are semi-in-ear headphones. When the user wears the headphones 100 configured to detect a wearing mode, the insertion depth of the second earplug 130 inserted into the ear canal is less than that of the first earplug 120, which can improve the user's sense of invasion when wearing the headphones, ensure good wearing comfort, and realize long time unsensible wearing.

Therefore, the headphones 100 configured to detect a wearing mode are compatible with both the in-ear wearing mode and the semi-in-ear wearing mode, so that users can freely choose the appropriate wearing mode to meet their different needs.

When users wear the headphones 100 configured to detect a wearing mode to listen to music, the volume of low frequency band will vary greatly due to the difference of in-ear structure (in-ear or semi-in-ear). Generally speaking, under the same audio gain condition, when the second earplug 130 is matched with the outer ear canal of the wearer, the sealing effect is poor, resulting in a lower volume in the low frequency band; on the other hand, when the first earplug 120 is matched with the outer ear canal of the wearer, the sealing effect is good, resulting in a higher volume in the low frequency band. By the way, in the high frequency band, due to the short wavelength of the sound wave, it is less affected by factors such as sealing effect, and the volume difference in different in-ear structures in the high frequency band is usually small.

In order to enable the user to enjoy better sound quality no matter which type of in-ear structure that the headphones worn by the user have, in this embodiment, a sensing member a112 connected with the control module a111 is further provided on the main body a110, and a sensed member a131 to which the sensing member a112 can respond is further provided on one of the first earplug 120 and the second earplug 130. For example, the second earplug 130 (semi-in-ear type) is provided with a sensed member a131, and there is no sensed member a131 on the first earplug 120 (in-ear type). Then, when the second earplug 130 is installed on the main body a110, the sensed member a131 enters the sensing range of the sensing member a112, and the sensing member a112 will respond. When the first earplug 120 is installed on the main body a110, the sensing member a112 will not respond. Therefore, the control module a111 can identify whether the first earplug 120 or the second earplug 130 is installed on the main body a110 through the change of the responses of the sensing member a112, thereby distinguishing in-ear headphones from semi-in-ear headphones to perform the corresponding audio control operation, and facilitating the subsequent realization of different sound effects and functions.

Specifically, when the second earplug 130 is installed on the main body a110, the headphones 100 configured to detect a wearing mode are semi-in-ear headphones. Since the sealing effect and low-frequency performance of the semi-in-ear headphones are poor, at this moment, the control module a111 can adjust the low-frequency EQ, improve the low-frequency audio signal gain, avoid the lack of low-frequency audio characteristics, and improve the bass sound effect of the headphones. When the first earplug 120 is installed on the main body a110, the headphones 100 configured to detect a wearing mode are in-ear headphones. Since the in-ear headphones are attached closely to the outer ear canal and have a good sealing performance, the audio signal is not easy to leak out. At this moment, the control module a111 can initiate the active noise reduction function, collect the external ambient noise of the headphones, and inversely superimpose it with the audio signal output from the speaker, and thus the ambient noise in the audio signal in the ear can be eliminated, thereby realizing the function of active noise reduction.

Therefore, the control module a111 can identify whether the first earplug 120 or the second earplug 130 is installed on the main body a110 through the change of the responses of the sensing member a112 to distinguish in-ear headphones from semi-in-ear headphones. Moreover, according to the different sound leakage characteristics of the in-ear structure and the semi-in-ear structure, the control module a111 is provided with an adaptive leakage compensation algorithm, so that it can be ensured that the headphones 100 configured to detect a wearing mode have similar or consistent acoustic characteristics in two states, and the sound quality of the headphones 100 configured to detect a wearing mode is not easily affected in two states, thereby ensuring that the in-ear headphones and semi-in-ear headphones can provide a uniform sound experience. Of course, for in-ear headphones and semi-in-ear headphones, the control module a111 may also perform other corresponding audio control operations, which are not limited in the present disclosure. The present disclosure identifies whether the headphones are in-ear headphones or semi-in-ear headphones through the cooperation of the sensing member a112 and the sensed member a131. The identification response speed is fast, the accuracy is high, the additional cost is very low, and the original ID and appearance of the product are not affected.

Specifically, the sensing member a112 is a Hall sensor, and the sensed member a131 is a magnet.

In this embodiment, the Hall sensor is provided on the main body a110 and located at a position where the main body a110 is combined with the first earplug 120 or the second earplug 130, for example, an end face of the main body a110 facing toward the first earplug 120 or the second earplug 130 (i.e., an end face of the main body a110 where the voice pipe 113 is provided), and the magnet is provided on the second earplug 130 and located at a position where the second earplug 130 is combined with the main body a110, for example, an end face of the second earplug 130 facing toward the main body a110. When the second earplug 130 is installed on the main body a110, the magnet enters the sensing range of the Hall sensor, and the Hall sensor generates the Hall effect and transmits the change signal to the control module a111, and thus it is identified that the second earplug 130 is installed on the main body a110. On the contrary, there is no magnet on the first earplug 120. When the first earplug 120 is installed on the body a110, the Hall sensor will not respond, and the control module a111 does not receive a change signal, and thus it is identified that the first earplug 120 is installed on the body a110.

Of course, the sensing member a112 and the sensed member a131 may also be other combinations in the prior art, such as a capacitive sensor and a charged body, an infrared sensor and a shielding body, etc., which are not limited in the present disclosure and can be set according to actual needs.

Figure 2:
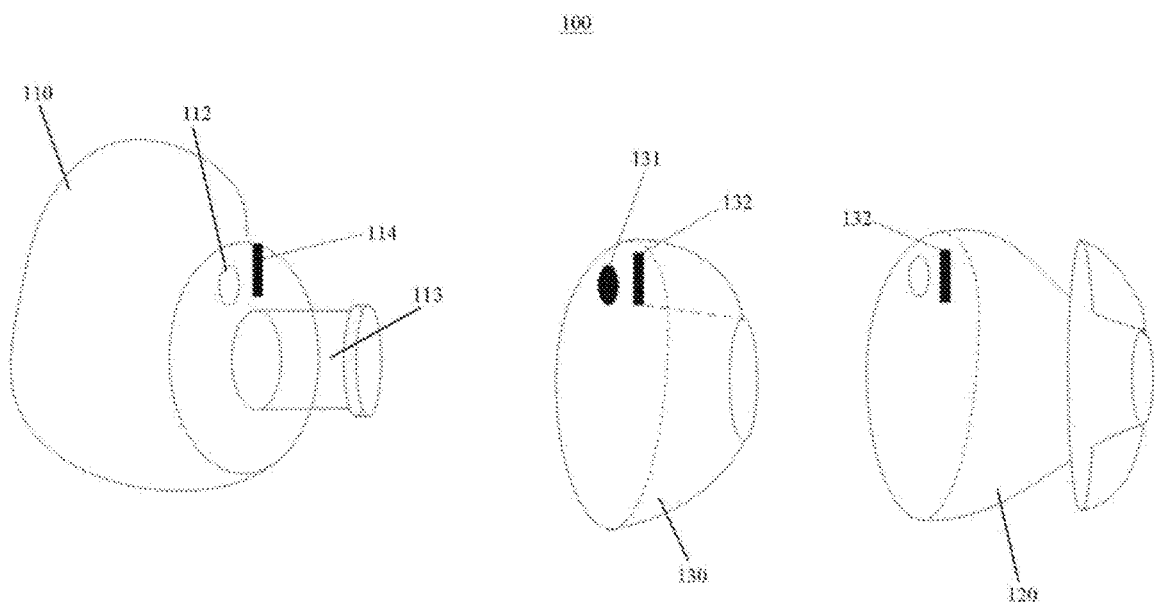
FIG. 2 is a schematic diagram of the structure of headphones for detecting a wearing mode according to an embodiment of the present disclosure.

Further, please refer to FIG. 2. The main body a110 is provided thereon with a position-limiting member, the first earplug 120 and the second earplug 130 are provided with a positioning member, and the positioning member is matched with the position-limiting member. When the first earplug 120 or the second earplug 130 is connected with the main body, the positioning member is engaged with the position-limiting member, and the sensed member a131 on the first earplug 120 or the second earplug 130 directly faces toward the sensing member a112.

In this embodiment, the position-limiting member is provided on the main body a110 and is located at the position where the main body a110 is combined with the first earplug 120 or the second earplug 130, for example, an end face of the main body a110 facing toward the first earplug 120 or the second earplug 130 (i.e., an end face of the main body a110 where the voice pipe 113 is provided), and the position-limiting member is provided on the first earplug 120 and located at a position where the first earplug 120 or the second earplug 130 is combined with the main body a110, for example, an end face of the first earplug 120 or the second earplug 130 facing toward the main body a110. When the first earplug 120 or the second earplug 130 is installed on the main body a110, the installation position and direction of the first earplug 120 or the second earplug 130 on the main body a110 can be defined through the cooperation of the position-limiting member and the positioning member, and the detection position of the sensed part a131 and the sensing member a112 can be matched. In this way, it can be ensured that the sensed member a131 is accurately sensed by the sensed member a131, prevent the second earplug 130 (the earplug provided with the sensed member a131) from being installed upside down due to the assembly operation error, and avoid the phenomenon that the sensing member a112 cannot accurately identify and the control module a111 does not timely adjust the control command, thereby ensuring a good user experience.

Specifically, one of the position-limiting member and the positioning member is a bump 114 and the other is a groove 132.

In this embodiment, the position-limiting member on the main body a110 is a bump 114, the positioning member on the first earplug 120 or the second earplug 130 is a groove 132, and the bump 114 and groove 132 are mutually matched. When the first earplug 120 or the second earplug 130 is installed on the main body a110, and the bump 114 is inserted into the groove 132 accurately, it can be determined that the first earplug 120 or the second earplug 130 is correctly installed. Of course, the structures of the position-limiting member and the positioning member may be other forms, such as two magnetic elements that can magnetically attract each other, etc., which are not limited in the present disclosure and can be set according to actual needs.

Figure 3:
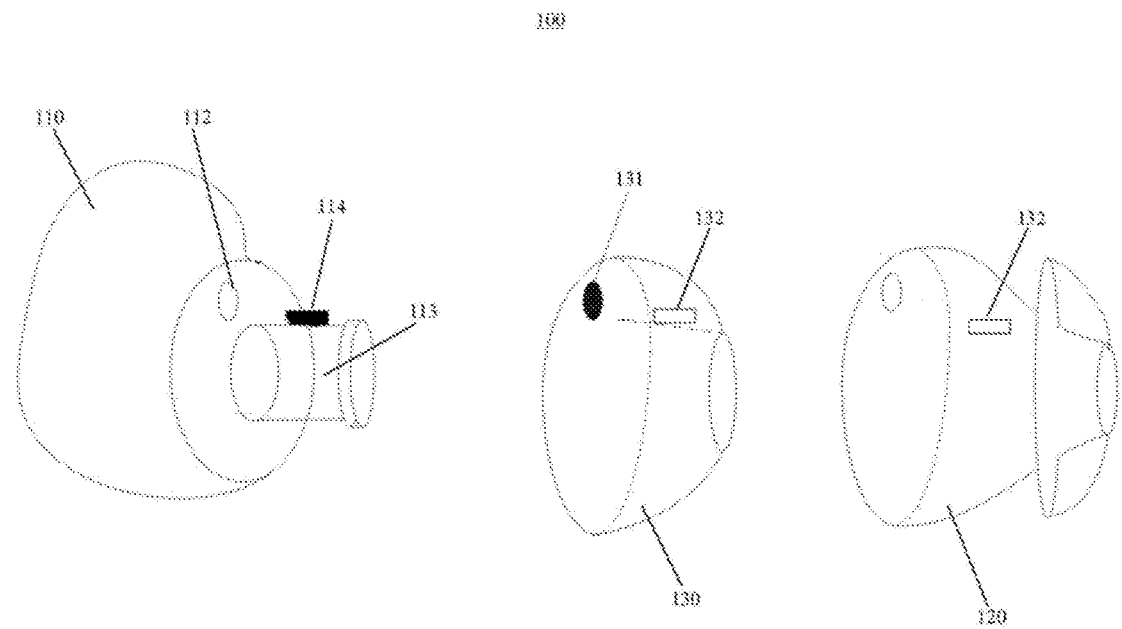
FIG. 3 is a schematic diagram of the structure of headphones for detecting a wearing mode according to another embodiment of the present disclosure.

As an implementation mode, please refer to FIG. 3. The main body a110 is provided thereon with a sound exit pipe 113, the first earplug 120 and the second earplug 130 are thereon provided with a sound exit hole, and the sound exit hole is matched with the sound exit pipe 113; the sound exit pipe 113 has an asymmetrical shape.

In this embodiment, the sound emitted from the speaker enters the human ear canal through the sound exit pipe 113 of the main body a110 and the sound exit hole of the first earplug 120 or the second earplug 130, thereby transmitting the sound to the human body. The sound exit pipe 113 has an asymmetric shape. For example, one of the bumps 114 may be provided on the circumferential side wall of the sound exit pipe 113, and the sound exit holes of the first earplug 120 and the second earplug 130 are correspondingly provided with a groove 132. In this way, the installation position and direction of the first earplug 120 or the second earplug 130 on the main body a110 can be defined to ensure that the sensed member a131 directly faces toward the sensing member a112. As another example, the sound exit pipe 113 may be designed to an up-down asymmetric shape, and the sound exit holes of the first earplug 120 and the second earplug 130 are designed to have a shape corresponding to the sound exit pipe 113. In this way, the first earplug 120 and the second earplug 130 can also be prevented from being installed upside down.

Figure 4:
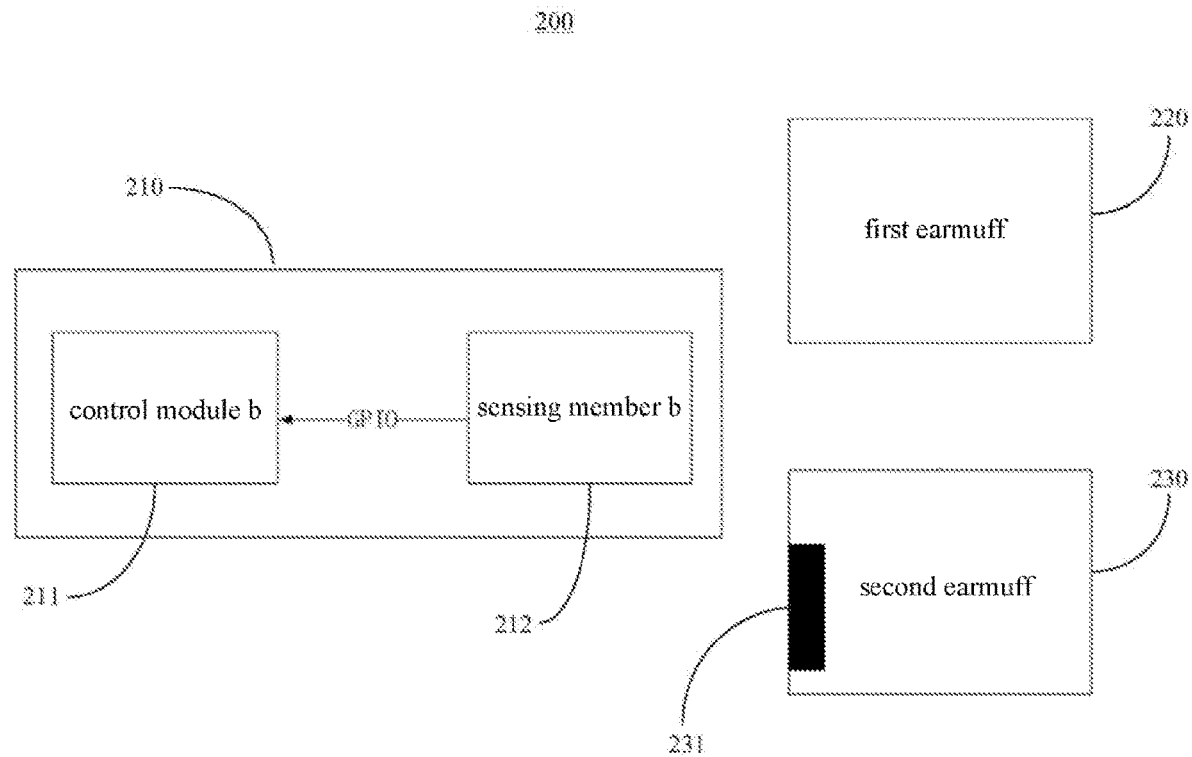
FIG. 4 is a schematic diagram of the circuit modules of headphones for detecting an earmuff material according to an embodiment of the present disclosure.

In the embodiment of the present disclosure, as shown in FIG. 4, the headphones 200 configured to detect an earmuff material comprises: a main body b210 provided therein with a control module b211 and a speaker (not shown in FIGs) that are connected with each other; a first earmuff 220 detachably connected with the main body b210 and for covering an ear; a second earmuff 230 detachably connected with the main body b210 and is configured to cover an ear; a sensing member b212 provided on the main body b210 and connected with the control module b211; and a sensed member b231 provided on the first earmuff 220 or the second earmuff 230. The material of the first earmuff 220 is different from the material of the second earmuff 230, and when the earmuff provided with the sensed member b231 is connected with the main body b210, the sensed member b231 is within a sensing range of the sensing member b212.

It can be understood that the control module b211 is used to control the output of audio and the speaker is used to output audio. Namely, the control module b211 receives electrical signals output from a media player or a receiver, converts the electrical signals into audible sound waves, and transmits them to the ear canal of the wearer through a speaker, thus realizing the audio playback function.

It should be noted that in this embodiment, the material of the first earmuff 220 is leather, and the material of the second earmuff 230 is cloth. The headphones 200 configured to detect an earmuff material are a headphones product which is compatible with the leather earmuffs and the cloth earmuffs. That is to say, by detachably installing the first earmuff 220 or the second earmuff 230 on the main body b210, the earmuff material of the headphones 200 configured to detect an earmuff material can be changed, so that the headphones 200 configured to detect an earmuff material can switch between the headphones with leather earmuffs and the headphones with cloth earmuffs.

Specifically, in the state that the first earmuff 220 is installed on the main body b210, the headphones 200 configured to detect an earmuff material are the headphones with leather earmuffs. When the user wears the headphones 200 configured to detect an earmuff material, the first earmuff 220 covers the ear. Since the leather material is dense and wear-resistant, it can well isolate external noise, which is conducive to active noise reduction and ensuring low frequency intensity; in the state that the second earmuff 230 is installed on the main body b210, the headphones 200 configured to detect an earmuff material are the headphones with cloth earmuffs. When the user wears the headphones 200 configured to detect an earmuff material, the second earmuff 230 covers the ear. Since the cloth is soft, breathable and good at heat dissipation, it can improve the user's sense of compression when wearing the headphones, ensure good wearing comfort, and realize long-term unsensible wearing.

Therefore, the headphones 200 configured to detect an earmuff material are compatible with both the in-ear wearing mode and semi-in-ear wearing mode, so that users can freely choose the appropriate material of the earmuffs to meet the different needs of users.

When users wear the headphones 200 configured to detect an earmuff material to listen to music, the volume of low frequency band will vary greatly due to the difference of earmuff materials (leather, cloth). Generally speaking, under the same audio gain condition, when the second earmuff 230 cooperates with the ear of the wearer, the sealing effect is poor, resulting in a lower volume in the low frequency band; on the other hand, when the first earmuff 220 cooperates with the ear of the wearer, the sealing effect is good, resulting in a higher volume in the low frequency band. By the way, in the high frequency band, due to the short wavelength of the sound wave, it is less affected by factors such as sealing effect, and the volume difference in different in-ear structures in the high frequency band is usually small.

In order to enable the user to enjoy better sound quality no matter which type of earmuff material that the headphones worn by the user have, in this embodiment, a sensing member b212 connected with the control module b211 is further provided on the main body b210, and a sensed member b231 to which the sensing member b212 can respond is further provided on one of the first earmuff 220 and the second earmuff 230. For example, the second earmuff 230 (cloth) is provided with a sensed member b231, and there is no sensed member b231 on the first earmuff 220 (leather). Then, when the second earmuff 230 is installed on the main body b210, the sensed member b231 enters the sensing range of the sensing member b212, and the sensing member b212 will respond. When the first earmuff 220 is installed on the main body b210, the sensing member b212 will not respond. Therefore, the control module b211 can identify whether the first earmuff 220 or the second earmuff 230 is installed on the main body b210 through the change of the responses of the sensing member b212, thereby distinguishing headphones with leather earmuffs from headphones with cloth earmuffs to perform the corresponding audio control operation, and facilitating the subsequent realization of different sound effects and functions.

Specifically, when the second earmuff 230 is installed on the main body b210, the headphones 200 configured to detect an earmuff material are headphones with leather earmuffs. Since the headphones with leather earmuffs have good sealing performance and high low-frequency performance, at this moment, the control module b211 can adjust the low-frequency EQ, reduce the gain of the low-frequency audio signal, avoid too strong low-frequency audio characteristic, and reduce the bass sound effect of the headphones. When the first earmuff 220 is installed on the main body b210, the headphones 200 configured to detect an earmuff material are headphones with cloth earmuffs. Since the in-ear headphones are attached closely to the outer ear canal and have a good sealing performance, the audio signal is not easy to leak out. At this moment, the control module b211 can initiate the active noise reduction function, collect the external ambient noise of the headphones, and inversely superimpose it with the audio signal output from the speaker, and thus the ambient noise in the audio signal in the ear can be eliminated, thereby realizing the function of active noise reduction.

Therefore, the control module b211 can identify whether the first earmuff 220 or the second earmuff 230 is installed on the main body b210 through the change of the responses of the sensing member b212 to distinguish headphones with leather earmuffs from headphones with cloth earmuffs. Moreover, according to the different sound leakage characteristics of the leather earmuffs and the cloth earmuffs, the control module b211 is provided with an adaptive leakage compensation algorithm, so that it can be ensured that the headphones 200 configured to detect an earmuff material have similar or consistent acoustic characteristics in two states, and the sound quality of the headphones 200 configured to detect an earmuff material is not easily affected in two states, thereby ensuring that the headphones with leather earmuffs and the headphones with cloth earmuffs can provide a uniform sound experience. Of course, for the headphones with leather earmuffs and the headphones with cloth earmuffs, the control module b211 may also perform other corresponding audio control operations, which are not limited in the present disclosure. The present disclosure identifies whether the headphones are headphones with leather earmuffs or headphones with cloth earmuffs through the cooperation of the sensing member b212 and the sensed member b231. The identification response speed is fast, the accuracy is high, the additional cost is very low, and the original ID and appearance of the product are not affected.

Figure 5:
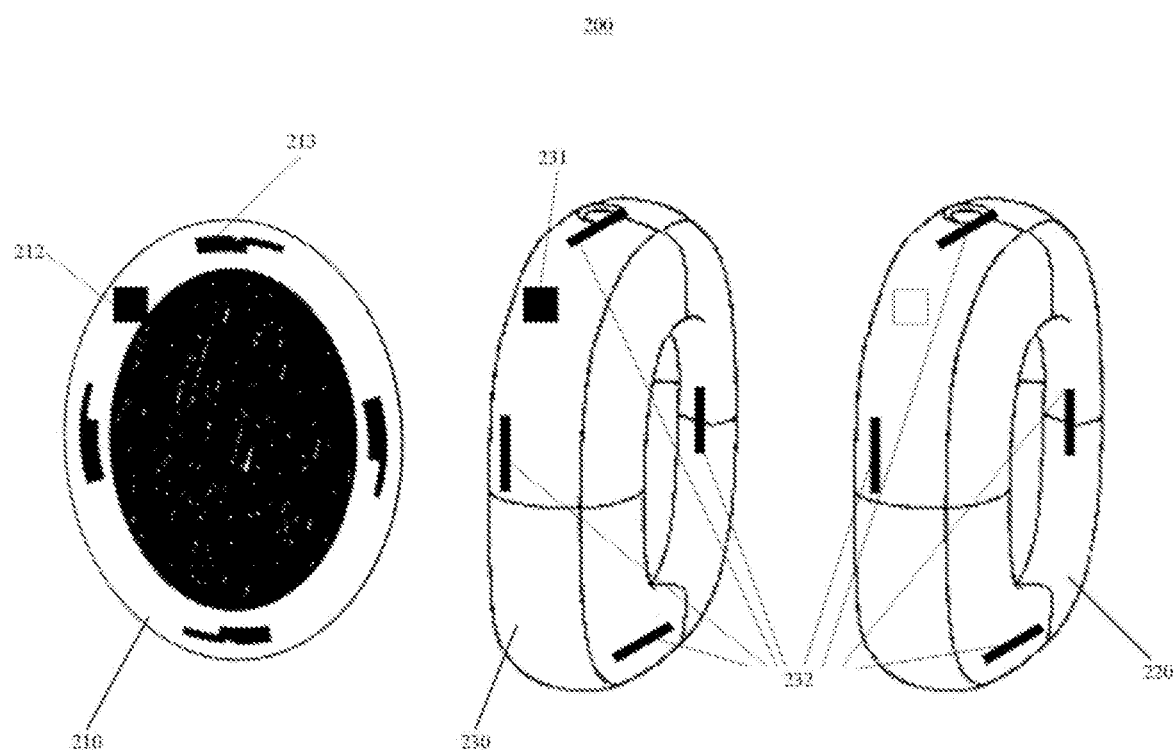
FIG. 5 is a schematic diagram of the structure of headphones for detecting an earmuff material according to an embodiment of the present disclosure.

Further, please refer to FIG. 5. The main body b210 is provided with a mounting member, the first earmuff 220 and the second earmuff 230 are provided a fixing member, and the fixing member is detachably connected with the mounting member.

In this embodiment, the installation of the first earmuff 220 or the second earmuff 230 on the main body b210 can be realized through the fixed connection between the fixing member and the mounting member; the separation of the first earmuff 220 or the second earmuff 230 from the main body b210 can be realized through the disassembly and separation of the fixing member and the mounting member. In order to ensure the stability of the installation, multiple groups of fixation structures may be set. For example, four angular positions on the main body b210 are provided with mounting members. Correspondingly, four angular positions on the first earmuff 220 and the second earmuff 230 are provided with fixing members.

Specifically, one of the fixing member and the mounting member is a snap protrusion 232 and the other is a snap slot 213.

In this embodiment, the mounting member on the main body b210 is the snap slot 213, the fixing member on the first earplug or the second earplug is the snap protrusion 232, and the snap protrusion 232 and the snap slot 213 are mutually matched. When the first earplug or the second earplug is installed on the body b210, the snap protrusion 232 is engaged with the corresponding snap slot 213 to realize the installation of the first earplug or the second earplug on the main body b210. Of course, the structures of the mounting member and the fixing member may be other forms, such as two magnetic absorbing members that can magnetically attract each other, etc., which are not limited in the present disclosure and can be set according to actual needs.

Optionally, referring to FIG. 5, the main body b210 is provided thereon with the snap slot 213, the snap slot 213 comprises an entry part and a clamping part, the entry part and the clamping part are arranged and connected along a circumferential direction of the main body b210, a slot body width of the entry part is the same as a slot body width of the clamping part, and a slot mouth width of the clamping part is less than a slot mouth width of the entry part. The first earmuff 220 and the second earmuff 230 are provided thereon with the snap protrusion 232, the snap protrusion 232 comprises a connecting part and an acting part, the acting part is connected with the first earmuff 220 and the second earmuff 230 through the connecting part, a width of the connecting part corresponds to the slot mouth width of the clamping part, and a width of the acting part corresponds to the slot body width of the clamping part.

As a specific connection form of the snap protrusion 232 and the snap slot 213, in this embodiment, the method of clamping by rotation is used to realize the engagement of the snap protrusion 232 and the snap slot 213. There are a plurality of snap slots 213, which are evenly distributed on the circumferential side wall (outer wall) of the main body b210 along the circumferential direction of the main body b210. Along the circumferential direction of the main body b210, the slot body widths of the snap slots 213 are consistent, and the slot mouth widths of the snap slots 213 are inconsistent. It should be noted that the width here refers to a spacing between two edges of the snap slot 213 along the axial direction of the main body b210. There are a plurality of snap protrusions 232, which are evenly distributed on the circumferential side wall (inner wall) of the first earmuff 220 or the second earmuff 230 along the circumferential direction of the first earmuff 220 or the second earmuff 230. Along the radial direction of the first earmuff 220 or the second earmuff 230, the widths of the snap protrusions 232 are thin first and then thick, i.e., the width of the acting part is greater than the width of the connecting part. The width here refers to a spacing between two edges of the snap protrusion 232 along the axial direction of the first earmuff 220 or the second earmuff 230. Through the above settings, the effect of clamping by forward rotation and separating by reverse rotation can be achieved, and thus the detachable connection between the first earmuff 220 or the second earmuff 230 and the main body b210 is realized, and the first earmuff 220 or the second earmuff 230 can be prevented from falling off the main body b210 when installed on the main body b210; moreover, the installation operation is simple and fast, which is conducive to improving the user's experience.

Of course, the positions of the snap slot 213 and the snap protrusion 232 can be exchanged, which can also achieve the above effect of clamping by rotation and will not be repeated here. Specifically, the first earmuff 220 and the second earmuff 230 are provided thereon with the snap slot 213, the snap slot 213 comprises an entry part and a clamping part, the entry part and the clamping part are arranged and connected along a circumferential direction of the first earmuff 220 and the second earmuff 230, a slot body width of the entry part is the same as a slot body width of the clamping part, and a slot mouth width of the clamping part is less than a slot mouth width of the entry part; the main body b210 is provided thereon with the snap protrusion 232, the snap protrusion comprises a connecting part and an acting part, the acting part is connected with the main body through the connecting part, a width of the connecting part corresponds to the slot mouth width of the clamping part, and a width of the acting part corresponds to the slot body width of the clamping part.

Further, the main body b210 is provided with a plurality of mounting members in the circumferential direction, and at least one of the plurality of mounting members is different in shape and/or size from other mounting members.

In order to ensure that the first earplug or the second earplug can be correctly installed on the main body b210, in this embodiment, at least one of the plurality of mounting members has a different structure from other mounting members. For example, one of the mounting members is a rectangular snap slot 213 (the corresponding fixing member on the first earplug or the second earplug is a rectangular snap protrusion 232), and other mounting members are spherical snap slots 213 (the corresponding fixing members on the first earplug or the second earplug are spherical snap protrusions 232). In this way, the rectangular snap protrusion 232 can only be clamped into the rectangular snap slot 213, and the spherical snap protrusions 232 can only be clamped into the spherical slots 213. Namely, the first earplug or the second earplug must be installed on the main body b210 according to preset direction and positions. As another example, the plurality of mounting members are all rectangular snap slots 213 (the fixing members on the first earplug or the second earplug are all rectangular snap protrusions 232), but the overall size of one snap slot 213 is greater than the overall sizes of other snap slots 213 (the overall size of one corresponding snap protrusion 232 on the first earplug or the second earplug is greater than the overall sizes of other snap protrusions 232). In this way, the snap protrusion 232 with the larger overall size can only be clamped into the snap slot 213 with the larger overall size, and the snap protrusions 232 with the smaller overall sizes can only be clamped into the snap slot 213 with the smaller overall sizes. Namely, the first earplug or the second earplug must be installed on the main body b210 according to preset direction and positions. Through the above settings, the second earmuff 230 (i.e., the earmuff provided with the sensed member b231) can be prevented from being installed upside down due to the assembly operation error, and thus it can be ensured that the detection position of the sensed member b231 and the sensing member b212 are matched, thereby avoiding the phenomenon that the sensing member b212 cannot be accurately identified and the control module b211 does not timely adjust the control command, and ensuring a good user experience.

The above only describes the preferred embodiments of the present disclosure, and is not intended to limit the protection scope of the present disclosure. All technical solutions obtained by equivalent structural transformations made on the contents of the description and drawings of the present disclosure or direct/indirect application in other related technical fields under the inventive concept of the present disclosure shall fall within the scope of patent protection of the present application.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. Headphones configured to detect an earmuff material, comprising:
    a main body provided therein with a control module and a speaker that are connected with each other;
    a first earmuff detachably connected with the main body and is configured to cover an ear;
    a second earmuff detachably connected with the main body and is configured to cover an ear;
    a sensing member provided on the main body and connected with the control module; and
    a sensed member provided on the first earmuff or the second earmuff;
    wherein the main body is provided thereon with a mounting member, the first earmuff and the second earmuff are provided thereon with a fixing member, and the fixing member is detachably connected with the mounting member, and
    wherein a material of the first earmuff is different from a material of the second earmuff, and when the first earmuff or the second earmuff provided with the sensed member is connected with the main body, the sensed member is within a sensing range of the sensing member.

2. The headphones configured to detect an earmuff material according to claim 1, wherein one of the mounting member and the fixing member is a snap protrusion and the other is a snap slot.

3. The headphones configured to detect an earmuff material according to claim 2, wherein the main body is provided thereon with the snap slot, the snap slot comprises an entry part and a clamping part, the entry part and the clamping part are arranged and connected along a circumferential direction of the main body, a slot body width of the entry part is the same as a slot body width of the clamping part, and a slot mouth width of the clamping part is less than a slot mouth width of the entry part; the first earmuff and the second earmuff are provided thereon with the snap protrusion, the snap protrusion comprises a connecting part and an acting part, the acting part is connected with the first earmuff or the second earmuff through the connecting part, a width of the connecting part corresponds to the slot mouth width of the clamping part, and a width of the acting part corresponds to the slot body width of the clamping part;

or, the first earmuff and the second earmuff are provided thereon with the snap slot, the snap slot comprises an entry part and a clamping part, the entry part and the clamping part are arranged and connected along a circumferential direction of the first earmuff or the second earmuff, a slot body width of the entry part is the same as a slot body width of the clamping part, and a slot mouth width of the clamping part is less than a slot mouth width of the entry part; the main body is provided thereon with the snap protrusion, the snap protrusion comprises a connecting part and an acting part, the acting part is connected with the main body through the connecting part, a width of the connecting part corresponds to the slot mouth width of the clamping part, and a width of the acting part corresponds to the slot body width of the clamping part.

4. The headphones configured to detect an earmuff material according to claim 3, wherein the main body is provided thereon with a plurality of the mounting members along a circumferential direction, and at least one of the mounting members is different in shape and/or size from the plurality of the mounting members.

5. The headphones configured to detect an earmuff material according to claim 2, wherein the main body is provided thereon with a plurality of the mounting members along a circumferential direction, and at least one of the mounting members is different in shape and/or size from the plurality of the mounting members.

6. The headphones configured to detect an earmuff material according to claim 1, wherein the main body is provided thereon with a plurality of the mounting members along a circumferential direction, and at least one of the mounting members is different in shape and/or size from the plurality of the mounting members.

* * * * *